(12) United States Patent  (10) Patent No.: US 8,033,537 B2
Wuethrich  (45) Date of Patent: Oct. 11, 2011

(54) CONSTRUCTION SET COMPRISING AT LEAST ONE PLATE

(75) Inventor: Roland Wuethrich, Lohn-Ammannsegg (CH)

(73) Assignee: Konstruktionsbuero Wuethrich, Lohn-Ammannsegg (CH)

( * ) Notice: Subject to any disclaimer, the term of this patent is extended or adjusted under 35 U.S.C. 154(b) by 1083 days.

(21) Appl. No.: 11/843,831

(22) Filed: Aug. 23, 2007

(65) Prior Publication Data

US 2008/0070469 A1  Mar. 20, 2008

(30) Foreign Application Priority Data

Sep. 20, 2006 (EP) .................................... 06405396

(51) Int. Cl.
*B23Q 3/00* (2006.01)
(52) U.S. Cl. ..................... 269/289 R; 446/124
(58) Field of Classification Search .............. 269/289 R, 269/900, 302.1, 43, 47; 446/124; *B32P 11/02*
See application file for complete search history.

(56) References Cited

U.S. PATENT DOCUMENTS

| | | | | |
|---|---|---|---|---|
| 683,184 A * | 9/1901 | Rockwell | | 29/256 |
| 724,116 A * | 3/1903 | Maley | | 101/385 |
| 2,076,207 A * | 4/1937 | Powell | | 29/283 |
| 2,621,807 A * | 12/1952 | Rendich | | 269/54.5 |
| 3,598,392 A * | 8/1971 | Williamson et al. | | 269/27 |
| 3,967,816 A * | 7/1976 | Ramsperger et al. | | 269/9 |
| 4,310,963 A * | 1/1982 | Blumle | | 29/460 |
| 4,598,453 A * | 7/1986 | Wills | | 29/271 |
| 4,828,240 A * | 5/1989 | Longenecker et al. | | 269/47 |
| 5,709,256 A * | 1/1998 | Thormeier | | 144/286.1 |
| 5,887,733 A * | 3/1999 | Harvey et al. | | 211/182 |
| 5,984,291 A * | 11/1999 | Iwata et al. | | 269/73 |
| 6,047,958 A * | 4/2000 | Marinkovic | | 269/43 |
| 6,158,104 A * | 12/2000 | Roberts et al. | | 29/446 |
| 6,264,186 B1 * | 7/2001 | Hill | | 269/47 |
| 6,279,888 B1 * | 8/2001 | Wal, III | | 269/37 |
| 6,293,534 B1 * | 9/2001 | Leban | | 269/309 |
| 6,375,177 B1 * | 4/2002 | Witte | | 269/45 |
| 6,805,339 B2 * | 10/2004 | Witte | | 269/289 R |
| 6,857,628 B2 * | 2/2005 | Baker | | 269/45 |
| 7,036,810 B2 * | 5/2006 | Wal, III | | 269/296 |
| 7,083,166 B1 * | 8/2006 | Durfee | | 269/32 |
| 7,264,416 B2 * | 9/2007 | Kahl | | 403/187 |
| D563,768 S * | 3/2008 | Marino | | D8/354 |
| 7,357,385 B2 * | 4/2008 | Sato | | 269/309 |
| 7,364,146 B2 * | 4/2008 | Witte | | 269/45 |
| 7,517,269 B2 * | 4/2009 | Cyrus et al. | | 446/118 |
| 7,637,488 B2 * | 12/2009 | Zeng | | 269/302.1 |
| 7,686,553 B2 * | 3/2010 | Durfee, Jr. | | 411/107 |
| 7,722,059 B1 * | 5/2010 | Marino | | 280/86.75 |
| 7,735,816 B2 * | 6/2010 | Hashim | | 269/289 R |
| 7,749,042 B2 * | 7/2010 | Fulgenzi | | 446/108 |

(Continued)

FOREIGN PATENT DOCUMENTS

DE  29 03 706 A1  8/1980
EP  0 338 460 A2  10/1989

*Primary Examiner* — Lee D Wilson
*Assistant Examiner* — Jamal Daniel
(74) *Attorney, Agent, or Firm* — Young & Thompson

(57) ABSTRACT

The construction set comprises at least one plate (10) having through bores (11) that are arranged on a grid and counterbores (12*a*) that are arranged on both sides of said through bores for receiving a connecting element. The cross-section of said counterbores deviates from a circular shape in order to rotationally secure a connecting element received in the counterbore.

20 Claims, 4 Drawing Sheets

U.S. PATENT DOCUMENTS

| | | | |
|---|---|---|---|
| 2007/0262067 A1* | 11/2007 | Felk et al. | 219/385 |
| 2007/0281580 A1* | 12/2007 | Sambenedetto | 446/124 |
| 2008/0070469 A1* | 3/2008 | Wuethrich | 446/124 |
| 2008/0160875 A1* | 7/2008 | Leicht | 446/124 |
| 2009/0014935 A1* | 1/2009 | Zeng | 269/302.1 |
| 2009/0140111 A1* | 6/2009 | Marino | 248/201 |
| 2009/0146353 A1* | 6/2009 | Hashim | 269/13 |

* cited by examiner

FIG. 1
FIG. 2
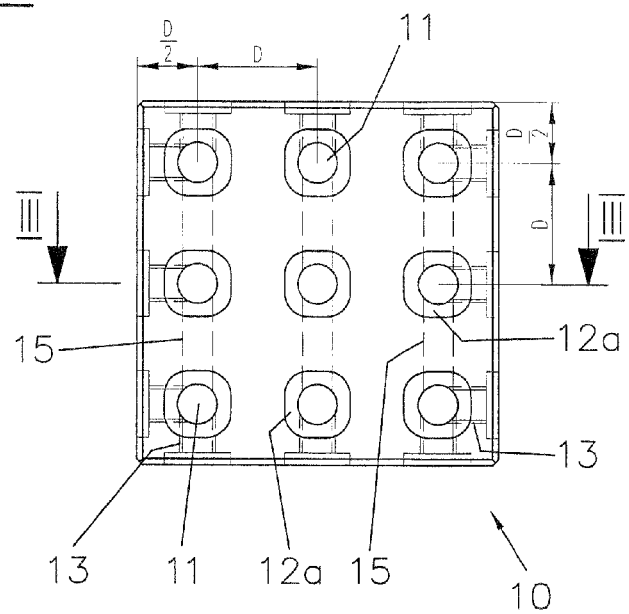
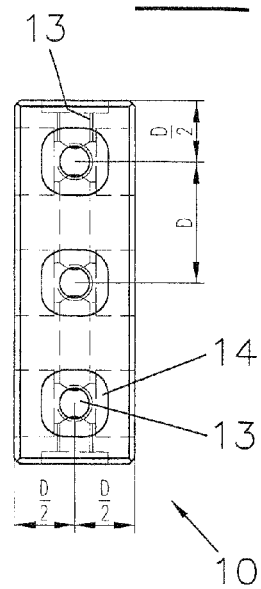
FIG. 3
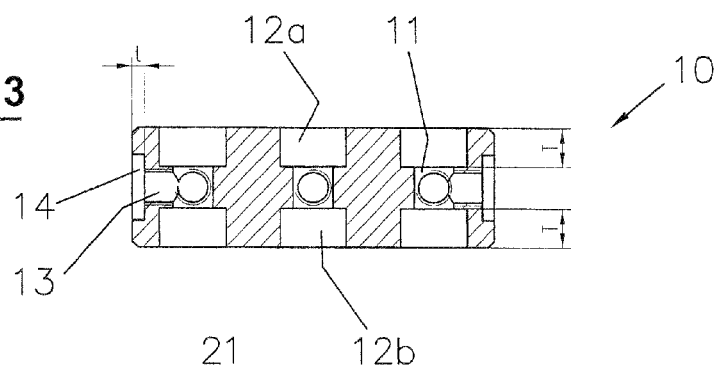
FIG. 4
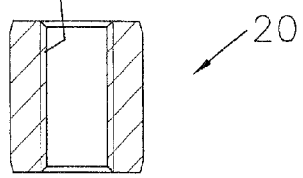
FIG. 6
FIG. 5
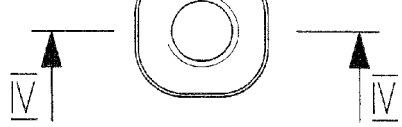

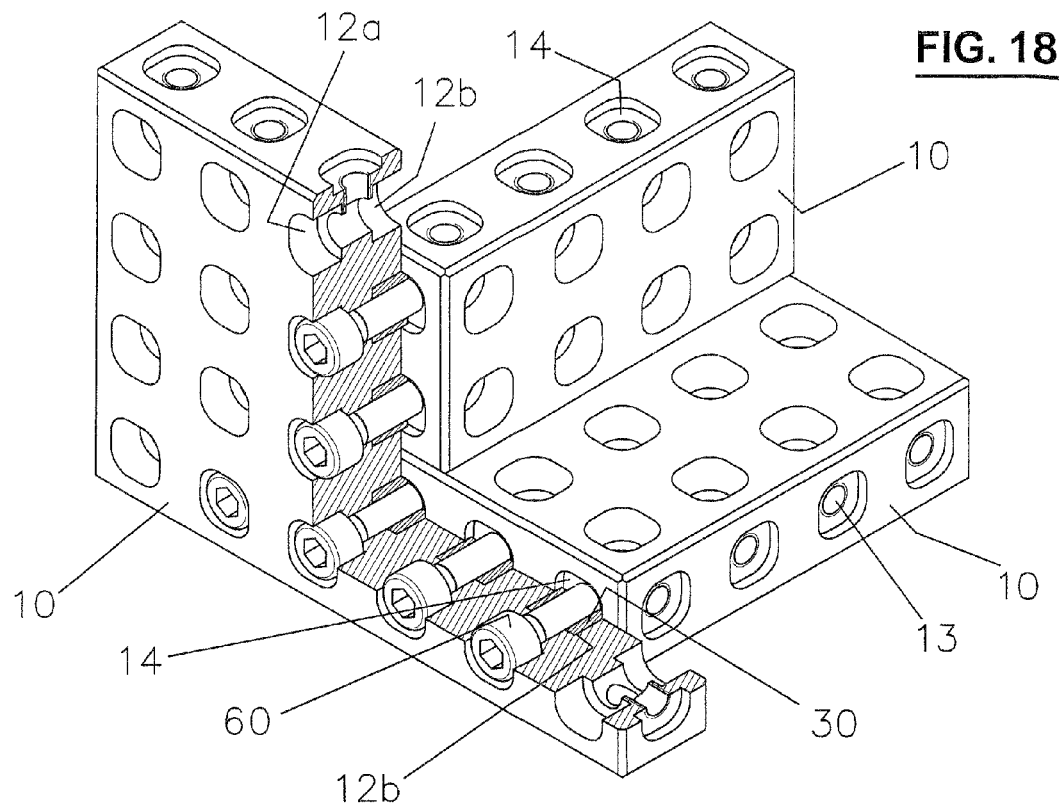
FIG. 18
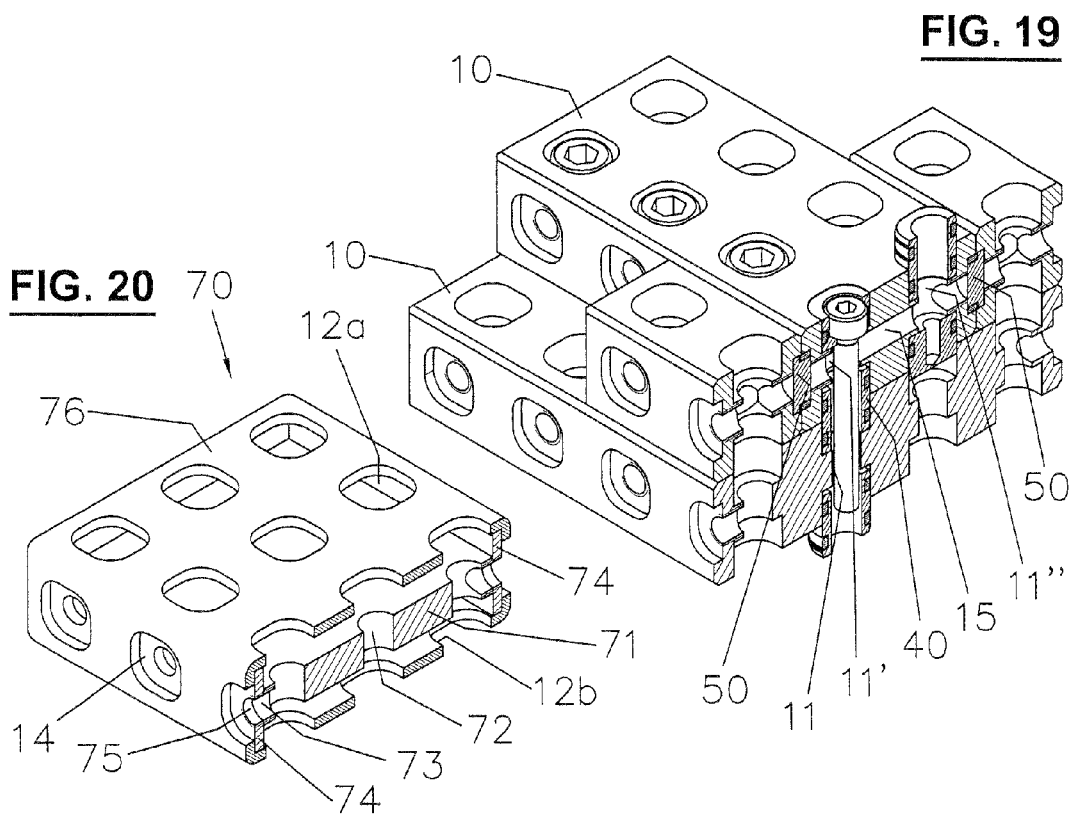
FIG. 19
FIG. 20

CONSTRUCTION SET COMPRISING AT LEAST ONE PLATE

FIELD OF THE INVENTION

The present invention refers to a construction set comprising at least one plate, which comprises through bores that are arranged on a grid, and counterbores that are arranged on both sides of the through bores for receiving a connecting element.

PRIOR ART

Such a construction set allows the creation of an assembly of plates that has precise angles and distances and that can again be disassembled if required. Such assemblies are applicable in various ways, e.g. as fixtures for workpieces, as a mounting device, test device, etc.

EP 338 460 A2 discloses a construction set comprising a plate that has through bores with circular cylindrical counterbores. To connect two plates, circular cylindrical connecting elements in the form of fastening screws as well as nuts are received in the counterbores. Suitable measures have to be taken to prevent the connecting elements from rotating while the fastening screws are being tightened. To this end, inter alia, the nut is provided with a slot for a screwdriver while the fastening screw has a recess for a hexagon tool. This configuration hinders a quick creation of an assembly as the user has to handle two tools at the same time and both sides of the plates must be accessible.

SUMMARY OF THE INVENTION

Based on this prior art, an object of the present invention is to further develop the known construction set so as to simplify its assembling.

This is accomplished by a construction set wherein the cross-section of the counterbores deviates from a circular shape in order to rotationally secure a connecting element received in the counterbore.

The provision of counterbores having a non-circular cross-section offers the advantage that means for rotationally securing a connecting element received in the counterbore are provided in a simple manner. This allows a simplified handling during the assembling. In particular, multiple plates can be connected using a single tool.

The further claims indicate preferred embodiments of the construction set.

BRIEF DESCRIPTION OF THE DRAWINGS

The invention will be explained in more detail hereinafter by means of exemplary embodiments and with reference to figures, of which FIG. 1 shows a plan view of a plate of a construction set of the invention;

FIG. 2 shows a side elevation of the plate of FIG. 1;

FIG. 3 shows a sectional view of the plate according to line III-III in FIG. 1;

FIG. 4 shows a view of a first connecting element in a section according to line IV-IV in FIG. 5;

FIG. 5 shows a top view of the connecting element of FIG. 4;

FIG. 6 shows a perspective view of the connecting element of FIG. 4;

FIG. 18 shows a partly sectioned perspective view of a third assembly of three connected plates;

FIG. 19 shows a partly sectioned perspective view of a fourth assembly of a plurality of connected plates; and FIG. 20 shows a partly sectioned perspective view of another embodiment of the plate of a construction set of the invention.

DETAILED DESCRIPTION OF PREFERRED EMBODIMENTS

Figure 7:
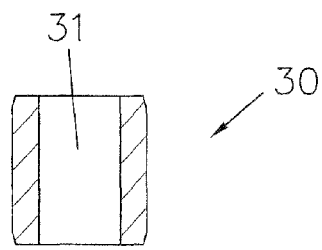
FIG. 7 shows a view of a second connecting element in a section according to line VII-VII in FIG. 8.

FIGS. 1 to 3 show by way of example a plate 10 of a construction set of the invention. Plate 10 is essentially parallelepipedic in shape and provided with through bores 11 that lead from the upper side of plate 10 to its lower side and that are arranged on a grid. The grid is chosen such that the centers of through bores 11 are located on the grid points of a square lattice. The grid dimension, i.e. the distance D between any two adjacent through bores 11, is thus constant.

Plate 10 shown in FIGS. 1 to 3 has the following dimensions: its length and width correspond to 3D, and its height corresponds to D. Of course, these dimensions can be chosen so as to be any multiple of D. Correspondingly, the total number of through bores 11 will be different. Through bores 11 situated at the edge of plate 10 are located at a distance D/2 from the edge. Thus, when another plate 10 is arranged on the upper or lower side of plate 10 or on one of its lateral surfaces, the distance between any two adjacent through bores 11 still corresponds to the value D.

Depending on the intended application, a grid different from a square lattice is also conceivable, e.g. a rectangular lattice where the distance between two through bores 11 arranged next to each other in the vertical direction is different from the distance between two through bores 11 arranged next to each other in the horizontal direction. The grid may also be in the form of a polar arrangement where through bores 11 are each displaced by a certain angle on circle lines.

Furthermore, a through bore 11 need not necessarily be arranged on each grid point but any desired through bores 11 may be omitted. It is also conceivable to provide further through bores 11 that are not located on the grid.

As appears particularly in FIG. 3, through bores 11 have a stepped configuration. They comprise a smooth cylindrical middle portion and their ends are each provided with counterbores 12a and 12b that are not cylindrical. The cross-section of counterbores 12a, 12b thus deviates from a circular shape, thereby allowing a connecting element that is received in a counterbore 12a, 12b to be rotationally secured.

In the exemplary embodiment shown here, the cross-section of counterbores 12a, 12b has a shape that is essentially square while the edges are rounded. For counterbores 12a, 12b, various non-circular shapes are conceivable. They may e.g. have one of the following cross-sectional shapes: essentially that of a polygon having three, four, or more corners, an oval shape, the shape of an oblong hole, any other shape that is composed of straight and/or round sections, etc.

As shown particularly in FIGS. 2 and 3, the lateral surfaces of plate 10 are provided with bores 13 that are arranged on the grid of through bores 11 and thus located at a mutual distance that corresponds to grid dimension D. Each bore 13 is distanced from the external surface of plate 10 by a counterbore 14 and provided with a thread that extends into through bore 11. The cross-section of counterbores 14 is the same as that of counterbores 12a, 12b. However, the depth t of counterbores 14 needs not be the same as the depth T of counterbores 12a, 12b.

As indicated by the dashed lines in FIG. 1, through bores 11 are connected by transversal bores 15 that are arranged in the prolongation of the threaded bores 13 located on the front and rear lateral surfaces of plate 10. Transversal bores 15 serve for conducting a fluid and may be omitted depending on the intended application of plate 10.

In order to connect plate 10 to another plate of the same kind, different connecting elements are provided.

FIGS. 4 to 6 show a connecting element 20 that serves as a nut for a fastening screw and is in the shape of a sleeve having an internal thread 21. The shape of the external surface of nut 20 is chosen such as to be complementary to the shape of counterbores 12a, 12b, 14. In this manner, connecting element 20 is connectable to plate 10 in a positively and precisely fitting manner by being inserted in a counterbore 12a, 12b, 14. Due to the non-circular shape of counterbores 12a, 12b, 14 and of connecting element 20, the latter is rotationally secured, e.g. when a fastening screw engaging in internal thread 21 is being tightened.

Figure 8:
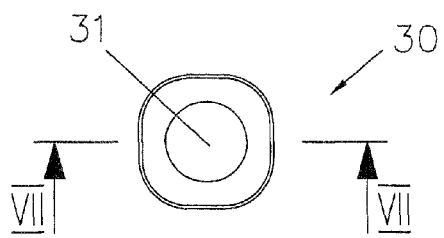
FIG. 8 shows a top view of the connecting element of FIG. 7.
Figure 9:
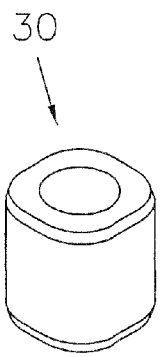
FIG. 9 shows a perspective view of the connecting element of FIG. 7.

FIGS. 7 to 9 show a connecting element 30 that serves as a centering element for positioning two plates and has a smooth through bore 31. The external surfaces of centering element 30 have the same shape as nut 20. Connecting element 30 allows two plates 10 to be arranged in a precise mutual relationship by inserting it in two opposite counterbores 12a, 12b, 14 of the two plates 10.

In order to form an assembly that is also applicable in the field of fluid technology, some connecting elements may further be provided with sealing means.

Figure 10:
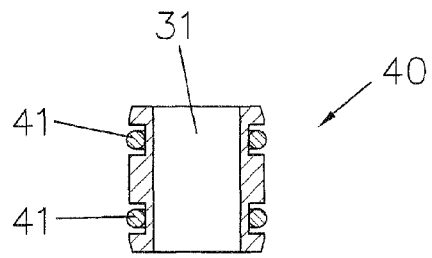
FIG. 10 a view of a third connecting element in a section according to line X-X in FIG. 11.
Figure 11:
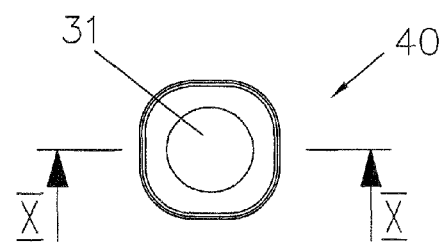
FIG. 11 shows a top view of the connecting element of FIG. 10.
Figure 12:
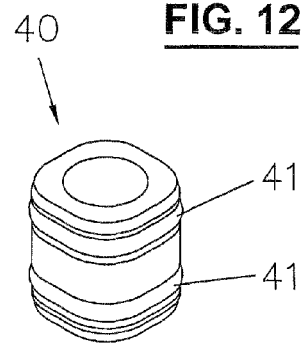
FIG. 12 shows a perspective view of the connecting element of FIG. 10.

FIGS. 10 to 12 show a connecting element 40 that serves as a passage element and is designed similarly to connecting element 30 but provided with two grooves in which O-rings 41 are inserted. By means of connecting element 40, a sealing connection of two plates—except for passage opening 31—can be obtained.

Figure 13:
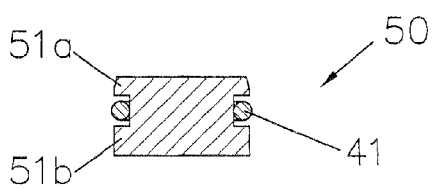
FIG. 13 shows a view of a fourth connecting element in a section according to line XIII-XIII in FIG. 14.
Figure 14:
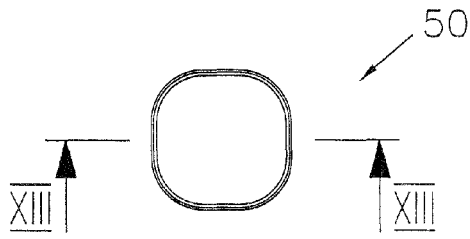
FIG. 14 shows a top view of the connecting element of FIG. 13.
Figure 15:
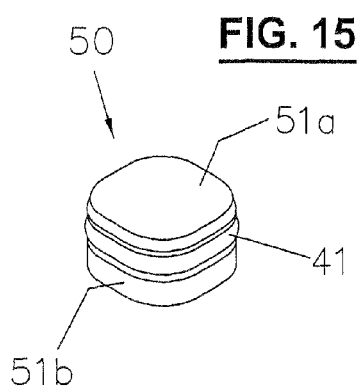
FIG. 15 shows a perspective view of the connecting element of FIG. 13.

FIGS. 13 to 15 show a connecting element 50 that serves as a closure element and that allows a bore 11, 13 of plate 10 to be tightly sealed. The lower part 51b of connecting element 50 corresponds to the shape of counterbore 12a, 12b, 14. The upper part 51a has a groove with an O-ring 41 and is closed particularly on the upper side.

Further types of connecting elements having sealing means are possible. For example, connecting element 20 may be provided with a sealing ring 41.

To form a construction set, connecting elements 20, 30, 40, 50 are produced in different heights. It is thus ensured that independently of counterbore 12a, 12b, 14 in which a connecting element 20, 30, 40, 50 is to be inserted, two plates 10 can be connected in a gapless manner. Also, plates 10 having different dimensions are provided.

Furthermore, connecting elements of the same kind as connecting elements 20, 30, 40, 50 may be provided which, rather than contacting the inner walls of counterbores 12a, 12b, 14 geometrically on all of their external sides, have a certain amount of play. Thus, for example, the external sides may be slightly set back in one direction such that the connecting element, when inserted in one of counterbores 12a, 12b, 14, has a certain amount of play in this direction while being precisely positioned in counterbore 12a, 12b, 14 in the direction perpendicularly thereto.

Connecting elements having a certain play may e.g. serve for connecting two plates such that they are precisely positioned with respect to one another in only one direction while being displaceable relative to each other in the other direction. It is also possible to use connecting elements having a certain play for compensating deviations from the specified grid that the arrangement of through bores 11 may exhibit. Such deviations may e.g. result from the fact that the dimensions of plate 10 are altered by temperature variations. In spite of such deviations, two plates can be connected by inserting e.g. one element without play and one with play in counterbores 12a, 12b, 14.

As a further embodiment, a connecting element having a circular cross-section is conceivable. Such a connecting element allows a plate 10 to be connected to a second plate 10 that has been rotated by any desired angle.

Figure 16:
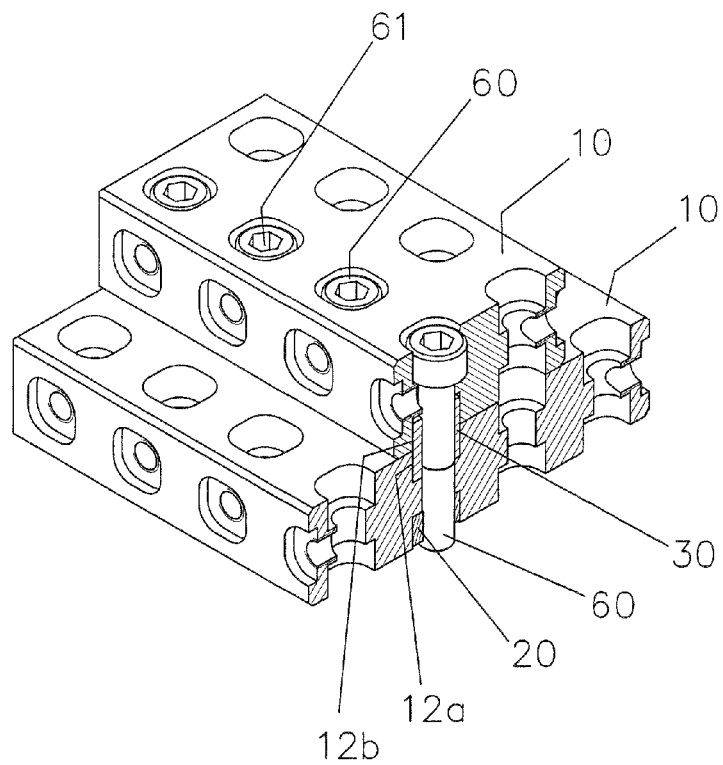
FIG. 16 shows a partly sectioned perspective view of a first assembly of two connected plates.
Figure 17:
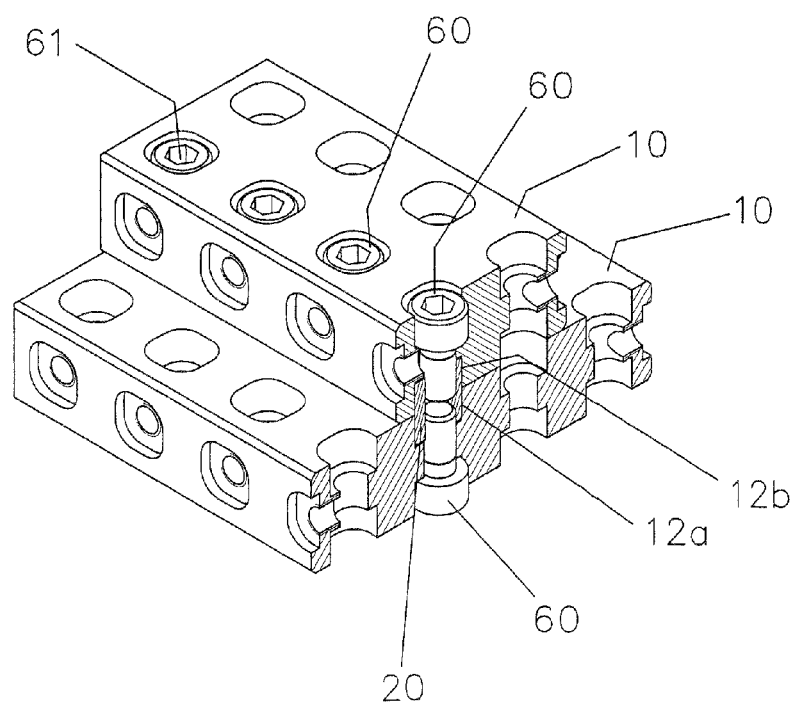
FIG. 17 shows a partly sectioned perspective view of a second assembly of two connected plates.

FIGS. 16 and 17 each show an example of an assembly of two plates 10 of different dimensions. In the assembly of FIG. 16, the two plates 10 are fastened by means of fastening screws 60 and nuts 20, respective centering elements 30 being inserted in adjoining counterbores 12a and 12b. In the assembly of FIG. 17, a nut 20 is inserted in adjoining counterbores 12a and 12b, in both sides of which the ends of respective fastening screws 60 engage.

Fastening screws 60 are of a type known in the art and are provided in different lengths in order to allow plates 10 to be assembled in a gapless manner. The head of a fastening screw 60 is cylindrical in shape and provided with a recess 61 in which a tool for tightening or untightening fastening screw 60 can engage. Recess 61 is e.g. shaped as a hexagon socket.

By means of threaded bores 13, a plate 10 can also be assembled with another plate 10 on one of its lateral surfaces, as illustrated in the example of FIG. 18. In order to connect them, centering elements 30 are inserted in adjoining counterbores 12b and 14, and fastening screws 60 are tightened in threaded bores 13.

If connecting elements 40, 50 are used, bores 11, 13 in plates 10 can be sealed as desired and thereby turned into channels through which a gaseous or liquid fluid can be led.

FIG. 19 shows an example where two plates 10 are connected by a connecting element 40, the lateral counterbores of upper plate 10 being sealed by means of closure elements 50. The result is a fluid connection of through bore 11 of lower plate 10 with adjoining through bore 11' of upper plate 10. The latter is furthermore fluidly connected to opposite through bore 11" via transversal bore 15.

As seen in the examples of FIGS. 16 to 19, counterbores 12a, 12b, 14 serve for receiving a connecting element 20, 30, 40, 50 and prevent any rotation thereof. Counterbores 12a and 12b on the upper and lower sides of plate 10 also form recesses in which the head of a fastening screw 60 can be received.

Plates 10 and connecting elements 20, 30, 40, 50, 60 are produced from a material that allows precise connections, so that plates 10 are connectable in a precise mutual relationship.

A metal such as aluminum or steel is e.g. suitable as a material. Counterbores 12a, 12b, 14 can e.g. be produced by milling.

Plates 10 need not necessarily be made in one piece, they may also be composed of a plurality of parts. FIG. 20 shows a variant of a multipart plate 70. The latter comprises a core plate 71, four lateral plates 74, and outer plates 76. Core plate 71 has through-going holes 72 as well as lateral threads 73 forming threaded bores 13 according to plate 10. Lateral plates 74 have holes 75 that are adjacent to threads 73 and form part of threaded bores 13. Outer plates 76 are provided with counterbores 12a, 12b, and 14. The upper and lower sides of core plate 71 are spaced apart from outer plates 76 such that holes 72 and the space between counterbores 12a, 12b and holes 72 form through bores 11 according to plate 10. Providing a material-free space ensures a particularly light construction of the plate.

To produce plate 70, lateral plates 74 are made from sheet metal and firmly connected to core plate 71, e.g. by bonding or welding. Outer plates 76 are manufactured by bending a sheet metal whose form corresponds to the developed view of a cuboid in such a manner that they encompass the edges of lateral plates 74. Finally, the edges of outer plates 76 are joined, e.g. by bonding or welding.

The construction set of the invention offers the advantage, inter alia, that by providing counterbores having a non-circular cross-section, a connecting element received therein can be rotationally secured in a simple manner.

The construction set of the invention allows a modular assembly of structures which have precise angles and distances and which can be used for various applications, e.g. for clamping workpieces in machining and/or measuring devices, as a mounting device, as a clamping device, etc. It is also possible to use the construction set for erecting a separating wall such as it is e.g. used in exhibition stands.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A construction set, comprising:
   at least one plate,
   wherein said plate comprises through bores that are arranged on a grid, counterbores that are arranged on both sides of said through bores for receiving a connecting element, and lateral surfaces that are provided with threaded bores,
   wherein the cross-section of said counterbores deviates from a circular shape in order to rotationally secure a connecting element received in one of said counterbores, and
   wherein at one end of said threaded bores, counterbores are provided whose shape corresponds to the shape of said counterbores of said through bores.

2. The construction set of claim 1, wherein said cross-section of said counterbores has a shape that includes straight sections.

3. The construction set of claim 1, wherein said grid is a square grid having a grid dimension D.

4. The construction set of claim 3, wherein said plate has a length, a width, and a height, at least one of said length, said width, and said height being a multiple of D.

5. The construction set of claim 1, comprising at least one connecting element that is insertable into said counterbores in a form-fitting manner.

6. The construction set of claim 5, wherein said connecting element is in the form of a sleeve.

7. The construction set of claim 5, wherein said connecting element has an internal thread.

8. The construction set of claim 5, wherein said connecting element comprises a sealing member.

9. The construction set of claim 1, wherein said plate comprises a core plate having holes that form said through bores and outer plates in which said counterbores are shaped, said counterbores being arranged at a distance from said core plate.

10. The construction set of claim 1, wherein the depth of the counterbores of said through bores is different from the depth of the counterbores of said threaded bores.

11. A construction set, comprising:
    at least one plate,
    said plate comprising two opposing sides, lateral sides that are arranged transversally to said two opposing sides, through bores that are arranged on a grid, each of said through bores extending transversally to said two opposing sides from a first bore end to a second bore end, first counterbores that are arranged at said first bore ends and said second bore ends, and second counterbores that are arranged on said lateral sides, wherein
    a cross-section of said first counterbores corresponds to a cross-section of said second counterbores and deviates from a circular shape in order to rotationally secure a connecting element when received in one of said first and second counterbores.

12. A construction set, comprising:
    at least one plate; and
    at least one connecting element,
    said plate comprising through bores that are arranged on a grid, and counterbores that are arranged on both sides of said through bores for receiving the at least one connecting element, wherein
    a cross-section of said counterbores deviates from a circular shape in order to rotationally secure the at least one connecting element when received in one of said counterbores, and
    said at least one connecting element includes two opposed ends, a shape of each of said two opposed ends being complementary to a shape of said counterbores for forming a form-fitting connection when said at least one connecting element is inserted into one of said counterbores.

13. The construction set of claim 12, wherein said cross-section of said counterbores has a shape that includes straight sections.

14. The construction set of claim 12, wherein said plate comprises lateral surfaces that are provided with threaded bores.

15. The construction set of claim 14, wherein at one end of said threaded bores, counterbores are provided with a cross-section corresponding to the cross-section of said counterbores of said through bores.

16. The construction set of claim 12, wherein said grid is a square grid having a grid dimension D.

17. The construction set of claim 16, wherein said plate has a length, a width, and a height, at least one of said length, said width, and said height being a multiple of said grid dimension D.

18. The construction set of claim 12, wherein said connecting element is in the form of a sleeve.

19. The construction set of claim 12, wherein said connecting element comprises at least one of an internal thread and a sealing member.

20. The construction set of claim 12, wherein said plate comprises a core plate having holes that form said through bores and outer plates in which said counterbores are shaped, said counterbores being arranged at a distance from said core plate.

* * * * *